(12) United States Patent
Flehmig

(10) Patent No.: US 11,938,577 B2
(45) Date of Patent: Mar. 26, 2024

(54) METHOD AND DEVICE FOR CUTTING A WORKPIECE

(71) Applicants: ThyssenKrupp Steel Europe AG, Duisburg (DE); thyssenkrupp AG, Essen (DE)

(72) Inventor: Thomas Flehmig, Ratingen (DE)

(73) Assignees: ThyssenKrupp Steel Europe AG, Duisburg (DE); Thyssenkrupp AG, Essen (DE)

( * ) Notice: Subject to any disclaimer, the term of this patent is extended or adjusted under 35 U.S.C. 154(b) by 586 days.

(21) Appl. No.: 17/055,670

(22) PCT Filed: Apr. 16, 2019

(86) PCT No.: PCT/EP2019/059785
§ 371 (c)(1),
(2) Date: Mar. 22, 2021

(87) PCT Pub. No.: WO2019/219315
PCT Pub. Date: Nov. 21, 2019

(65) Prior Publication Data
US 2023/0182244 A1    Jun. 15, 2023

(30) Foreign Application Priority Data
May 18, 2018 (DE) .................. 10 2018 112 056.7

(51) Int. Cl.
*B21D 28/02* (2006.01)
*B23D 35/00* (2006.01)
*B23P 23/04* (2006.01)

(52) U.S. Cl.
CPC ............. *B23P 23/04* (2013.01); *B21D 28/02* (2013.01); *B23D 35/001* (2013.01)

(58) Field of Classification Search
CPC ......... B21D 35/001; B21D 28/02; B26F 1/02; B26F 1/386; B26F 1/40; B23D 35/001; B23D 15/02; B23D 15/08
See application file for complete search history.

(56) References Cited

U.S. PATENT DOCUMENTS

| | | | |
|---|---|---|---|
| 4,213,385 A | 7/1980 | Dahlem | |
| 5,992,275 A | 11/1999 | Castricum | |

FOREIGN PATENT DOCUMENTS

| | | |
|---|---|---|
| CA | 2688043 A1 | 12/2008 |
| CN | 1281396 A | 1/2001 |

(Continued)

OTHER PUBLICATIONS

Machine translation of FR 2978686 A1 (Year: 2013).*
(Continued)

*Primary Examiner* — Christopher J Besler
(74) *Attorney, Agent, or Firm* — RMCK Law Group PLC

(57) ABSTRACT

The invention relates inter alia to a method for cutting a workpiece, in particular a blank or a component, comprising the following steps: inserting the workpiece into a cutting device, wherein the cutting device comprises a first tool half having at least one workpiece holder and at least one first cutting means, which comprises a first cutting edge and a contact surface, and a second tool half having at least one second cutting means having a second cutting edge and a contact surface, clamping the workpiece by means of the workpiece holder and the contact surface of the second cutting means, cutting the workpiece by means of the cutting means, the workpiece undergoes, prior to cutting, both a first prebending, which is produced substantially in the opposite direction counter to the cutting direction, and thereafter a second prebending in the cutting direction.

7 Claims, 7 Drawing Sheets

(56) References Cited

FOREIGN PATENT DOCUMENTS

Figure 1:
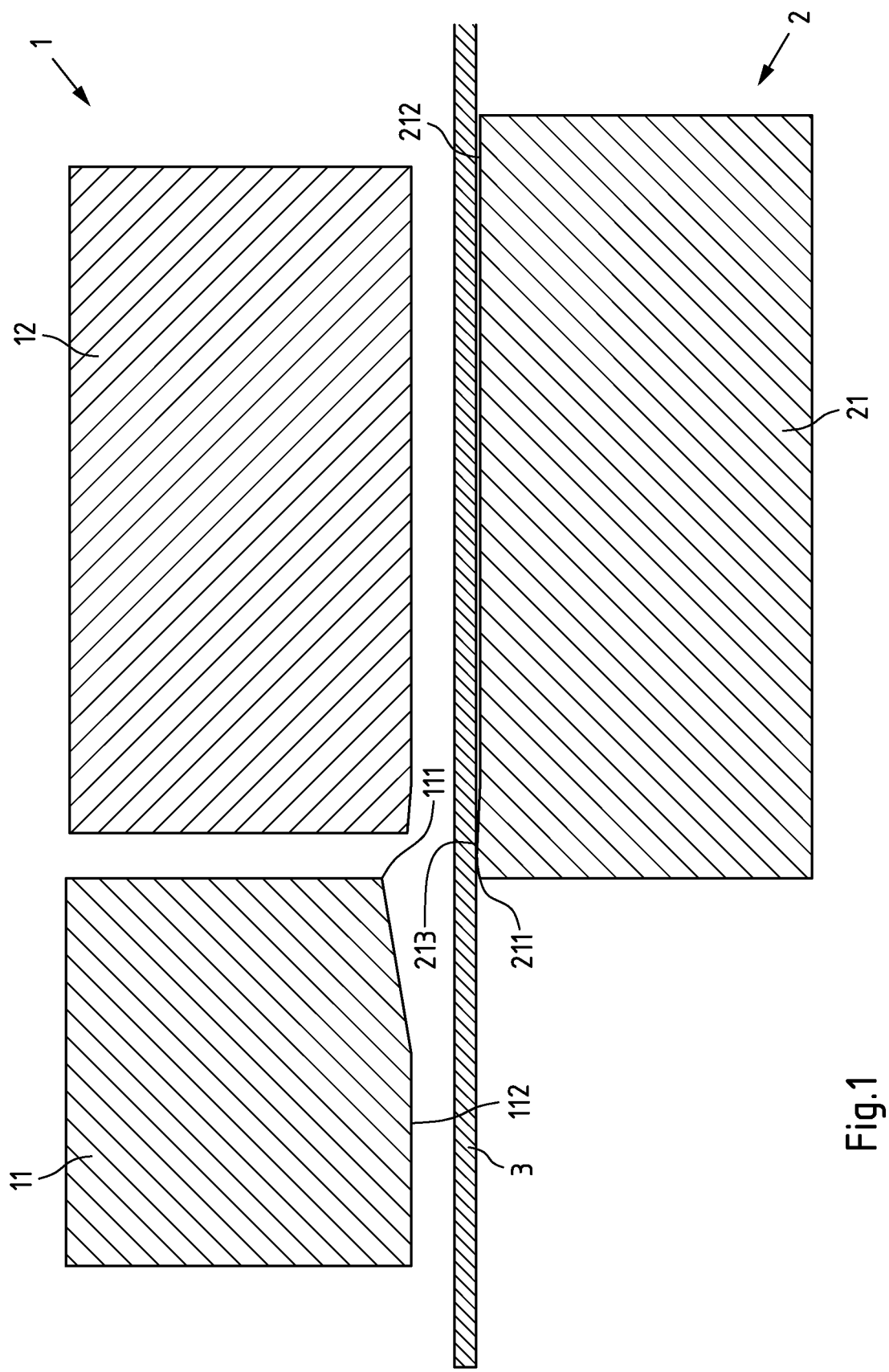

| CN | 104785645 | A |   | 7/2015  |           |
|----|-----------|---|---|---------|-----------|
| DE | 2739825   | A1|   | 3/1979  |           |
| DE | 102014100645 | A1 | | 7/2015 |           |
| DE | 102017103906 | A1 | | 8/2018 |           |
| EP | 0082237   | A1|   | 6/1983  |           |
| EP | 1623782   | A1|   | 2/2006  |           |
| FR | 2978686   | A1| * | 2/2013  | ............. B21D 24/16 |
| JP | S57205016 | A |   | 12/1982 |           |
| JP | S58149124 | A |   | 9/1983  |           |
| JP | 2017024035| A | * | 2/2017  |           |
| JP | 2017217698| A |   | 12/2017 |           |
| WO | 2005120741| A2|   | 12/2005 |           |

OTHER PUBLICATIONS

Machine translation of JP 2017024035 A (Year: 2017).*
International Search Report and Written Opinion for International Application No. PCT/EP2019/059785 dated Aug. 20, 2019 with English language translation, 11 pages.
German Office Action for DE Application No. 10 2018 112 056.7 dated Mar. 24, 2021.
Chinese Search Report for CN Application No. 2019800333157 dated Dec. 22, 2022.

\* cited by examiner

METHOD AND DEVICE FOR CUTTING A WORKPIECE

CROSS-REFERENCE TO RELATED APPLICATIONS

This application is a 371 U.S. National Stage of International Application No. PCT/EP2019/059785, filed Apr. 16, 2019, which claims priority to German Patent Application No. 10 2018 112 056.7, filed May 18, 2018. The disclosures of each of the above applications are incorporated herein by reference in their entirety.

The invention relates to a method for cutting a workpiece, in particular a blank or a component, comprising the following steps: inserting the workpiece into a cutting device, wherein the cutting device comprises a first tool half having at least one workpiece holder and at least one first cutting means, which comprises a first cutting edge and a contact surface, and a second tool half having at least one second cutting means having a second cutting edge and a contact surface, clamping the workpiece by means of the workpiece holder and the contact surface of the second cutting means, cutting the workpiece by means of the cutting means. The invention further relates to a device for cutting a workpiece, in particular a blank or a component to be trimmed, having a first tool half and a second tool half, wherein the first tool half comprises at least one workpiece holder and at least one first cutting means having a first cutting edge and a contact surface, and wherein the second tool half comprises at least one second cutting means having a second cutting edge and a contact surface.

Different cutting processes for cutting workpieces are known from the prior art. Workpieces are usually metal sheets or (sheet metal) blanks, but also parts produced by forming and/or joining, which normally undergo a plurality of cutting operations in the course of production processes. Before production of a workpiece, it is decided which machine and which cutting method are most suitable for these cutting operations. These cutting operations include, for example, shear cutting and laser cutting.

The aim of cutting processes is to produce cut edges of as high a quality as possible, which are characterized by a large proportion of smooth cut, little or no burr, rollover and fracture, little or no edge hardening and by a cut profile which is as vertical as possible.

These requirements can be fulfilled to a greater or lesser degree, depending on the material and tool design. In shear cutting, soft and tough materials tend toward a high proportion of smooth cut and little fracture, with a vertical cut profile. However, this comes at the cost of higher values for rollover and burr.

The converse applies in the case of high-strength and brittle materials, since these are very fine-grained. If they are cut, there is as good as no rollover and burr. There are relatively small or no proportions of smooth cut and a very high proportion of breakage which, if it runs exactly, can reduce edge cracking risks by comparison with compacted shear edges, because hardenings do not occur in the cut face.

Hardenings in the edge occur predominantly in soft or tough materials. They are the result of massive dislocation changes along and into the depth of the edge.

With regard to process variables, small cutting gaps and low cutting forces are sought. These are difficult to realize, however, especially for open cuts, since transverse forces during the cut cause gap widening. Although this does result in lesser cutting forces, it causes greater rollovers, burrs and oblique cut faces.

The cutting of high-strength and brittle materials proves to be particularly difficult. Owing to the very high yield points of the steels, the process forces, and thus the load on the cutting tools, are greatly increased. Subject to a particular load in this case are their cutting edges and the adjoining surfaces (end surfaces and lateral surfaces). Over the course of time, the cutting edges become blunt and/or facture, while the material of the end surfaces and lateral surfaces becomes fatigued by the continuous alternating load and, in combination with an abrasively acting cut material, becomes more and more eroded.

Moreover, in the modern production of vehicle parts, use is preferably made of high-strength materials, in particular steels. They can be both cold-formed and hot-formed, have tensile strengths up to 1900 MPa or even more and/or be very tough. In particular, the mechanical trimming of these materials causes high tool loading, with the result that the tools wear relatively quickly. In addition, worn tools cause higher machine loading and poor cut edge qualities.

In order to counter these effects, numerous studies and measures were implemented for cutting processes with high-strength steels. Thus, it would be conceivable to vary the cutting angles of the blades, to modify the geometry of the cutting edges, to shave precut edges, or to use fine blanking. However, it was not satisfactorily possible to achieve a low level of wear with a high quality of cut edge.

Document EP 1 623 782 A1 discloses a method in which the metal sheet to be cut is initially prebent by the upper blade in the effective region of the upper blade, with tensile and compressive stresses occurring in the metal sheet. These ensure that the contact with the upper blade cutting edge occurs only when the bending stresses in the metal sheet have already reached very high values. This relieves the load on the cutting edge of the upper blade and earlier crack initiation occurs in the cut region and thus the reduction in the compressive stresses on the cutting edge of the upper blade.

In particular in the case of high-strength and higher-strength steel materials it is possible for a prebend obtained in this way to ensure that, upon contact of the upper blade cutting edge, very high tensile stresses already occur on the metal sheet upper side and thus the upper blade is relieved. In this case, however, the tensile stress maximum is not situated at the cutting location, but in front, in the region of the upper blade. As a result, the compressive stresses on the underside load the bottom blade cutting edge to a particularly high degree, and therefore it is not possible to satisfactorily achieve a lower level of cutting means wear with high cut edge quality. In the case of closed cuts, the compressive stresses also load the lateral and end surface of the upper blade as a result of the prebending of the metal sheet.

The object on which the invention is based is accordingly to specify a quick and reliable method and a device for cutting a workpiece whereby the wear of the device, in particular the wear of the cutting means, is reduced with the same or even an improved cut edge quality.

The object specified above is achieved according to the invention in that, prior to cutting, the workpiece undergoes both a first prebending, which is produced substantially counter to the cutting direction, with in particular its stress maximum being situated substantially in the region of the contact surface of the second cutting means at a defined distance from the cutting location, and (preferably at a time point after the first prebending) a second prebending in the cutting direction, in particular for the cutting operation, which is situated in particular both in the region of the contact surface of the second cutting means and the contact surface of the first cutting means in the immediate vicinity of the cutting location. Here, the cutting direction is understood to mean in particular the direction in which the first cutting means moves.

By means of the aforementioned method, there is thus initially produced a first prebend, in particular at the cutting location, which, as required, can be larger, in particular much larger, than equivalent prebends in the prior art.

The bending operation for the in particular second, large prebend of the workpiece can occur immediately prior to carrying out the actual cutting operation. This is achieved in that one part of the prebend is situated in the effective region of the first cutting means and the other in the effective region of the second cutting means. That is to say that, before both the first cutting means and the second cutting means begin with the actual cutting operation, the aforementioned second, large prebend has already been introduced into the corresponding effective region. This can be achieved in turn for example by virtue of the fact that not only is the cutting edge of the first cutting means beveled at an obtuse angle of more than 90° with for example up to 10°, but also the cutting edge of the second cutting means is lowered in such a way that an obtuse angle of more than 90° results, wherein its advantageously planar contact surface initially rises ahead of the actual cutting edge by a defined amount (rising region) and then falls again by a further, preferably different amount toward the cutting edge in such a way that an obtuse angle of more than 90° results, that is to say forms a convex region. For example, the convex region is curved upward in a slightly S-shaped manner with respect to the advantageously planar contact surface. The tool holder shape is preferably complementary to the S shape and preferably reaches only up to the rising region of the convex region, as will be described in detail with respect to the device according to the invention.

It has been found that the method according to the invention provides particularly low stresses at the cutting edges of the cutting device. It has thus been shown in the course of simulation tests that the von Mises stresses at the cutting edges and in the workpiece can be reduced in this way by up to 40% during initial cutting. Thus, in the case of conventional cutting, the von Mises stresses at the cutting edges during the initial cutting or during the cutting operation of a high-strength material increase for example up to 1690 MPa both at the first cutting edge and at the second cutting edge. In the case of a prebend only in the region of the first cutting means, there occurs at the second cutting edge even a still higher von Mises stress of for example up to 1800 MPa.

By virtue of the method according to the invention, realized for example with a slightly S-shaped curvature of the contact surface of the second cutting means, the first and the second cutting edge have no contact with the workpiece during prebending on their way to initial cutting. During initial cutting itself, preferably slightly rounded cutting edges placed in a targeted manner then counteract further stress concentrations. As a result, for the actual cutting operation, only particularly low stress values of only, with respect to the aforementioned example, 1050 MPa are achieved at the cutting edges. During contact with the workpiece, the two cutting edges must thus apply only a small additional force until said workpiece is cut at the desired point or breaks in the case of high-strength materials.

By virtue of the larger and uniformly distributed prebending at the beginning of cutting, the stress maximum of the workpiece is advantageously preferably shifted into the cutting location and does not remain in the region of the first cutting means as in the case of a one-sided prebend. The reduction or the suppression of the transverse forces acting on the cutting means in particular further reduces the edge loading of the tools and the adjoining surfaces of the tools (end surfaces and lateral surfaces), which in turn brings about a better cut quality of the workpiece to be cut. The proportion of smooth cut which is barely present in high-strength materials avoids the formation of burrs on the sheet metal underside, with the result that substantially burr-free edges can be produced by the method according to the invention. In addition, by contrast with the prior art, a considerably lower cutting edge wear can be achieved, which can reduce the maintenance and repair effort and considerably prolong the tool service lives.

After cutting, the cut workpiece can either be further processed in the cutting device or be removed from the cutting device.

The method is particularly suitable for cutting of high-strength and brittle materials but, with appropriate modification of the prebending parameters, can also be used for the cutting of soft and tough materials.

The workpiece is preferably a steel material. For example, the workpiece is produced from a high-strength, higher-strength or ultra-high-strength steel material (for example having a tensile strength of more than 500 MPa, more than 700 MPa or even more than 1000 MPa). It has been shown that in particular workpieces having tensile strengths of up to 1900 MPa and more can be processed with the method according to the invention. In particular fine metal sheets having a thickness of 0.1 mm to 5.0 mm are preferably processed by the method according to the invention.

The first tool half and the first cutting means are preferably an upper tool half having an upper cutting means. The second tool half and the second cutting means are preferably a lower tool half having a lower cutting means. The first and the second cutting means are preferably designed as blades, in particular having in each case a slightly rounded cutting edge. The tool holder is preferably at least one holding-down means. The contact surface of the second cutting means is preferably a specifically configured bearing surface for placing or inserting a workpiece to be cut, wherein the workpiece holder has a contact surface which is preferably offset by the workpiece thickness and preferably designed to be complementary to the contact surface of the second cutting means. The contact surface of the first cutting means is formed in such a way that it allows a (second) prebending of the workpiece in the cutting direction before the cutting edges come into contact with the workpiece.

According to one embodiment of the method according to the invention, there is provision that the tensile stress in the workpiece produced by the first prebending is either less than its yield point, substantially corresponds to its yield point or is greater than its yield point.

Tensile stresses introduced in the workpiece at the cutting location are produced by the bending stress of the workpiece, wherein the tensile stresses or tensile force components produced in the workpiece act substantially transversely to the desired cut line to be produced and thus promote the initiation of the workpiece separation.

In the actual cutting operation, the simultaneous bending and shear stress of the workpiece to be separated substantially promotes the formation of a separating plane in the workpiece to be separated. Apart from the bending forces which are introduced in particular by the contact surfaces of the cutting blades, there occurs a dramatic reduction in the actual cutting forces and a likewise dramatic reduction in the tool wear with simultaneous improvement of the cut face quality.

The bending moment is preferably set to such a large value that the occurring maximum tensile stress comes close to or is greater than the yield point of the respective material. The statement substantially means here in particular a range of ±15% with respect to the yield point and of ±5% with respect to the tensile strength. For such a prestressed material, a relatively small shear stress by the cutting means is then sufficient for initiating and carrying out the separating operation.

According to a preferred embodiment of the method according to the invention, the workpiece preferably undergoes the first prebending during clamping between the workpiece holder or its contact surface and the contact surface (bearing surface) of the second cutting means. By lowering the workpiece holder before lowering the first cutting means, the prebending referred to here as first prebending is preferably initiated in terms of timing before the second prebending. The workpiece is preferably bent upward, with none of the cutting edges yet being in contact with the workpiece and thus no loading occurring thereon. The workpiece holder is in particular subjected to such a large force that the tensile stresses introduced into the metal sheet by the prebending cannot cancel the clamping.

In the further course and according to a further embodiment of the method according to the invention, the workpiece undergoes the second prebending during the lowering of the first cutting means and while the contact surface of the first cutting means comes into contact with the workpiece. Preferably and according to a further embodiment, the second prebending of the workpiece occurs here in the opposite direction to the first prebending. Here, the workpiece preferably firstly comes in particular, by virtue of the obtuse cutting edge angle, into contact with the resultant leading, in particular oblique contact surface of the first cutting means. This allows the (second) prebending of the workpiece substantially to the above-described stress values without the cutting edges being in contact with the workpiece during the prebending operation. This operation preferably occurs until directly before the initiation of the cutting operation.

For a high-quality cut/breakage it may be necessary for the prebending portion of the first prebend that is introduced by the contour of the workpiece holder in conjunction with the contour of the contact surface to be maintained only to such a degree that the metal sheet is not plastically deformed thereby. The prebending angle is then material-dependent. The higher the strength and the thinner the material, the greater it can be, and vice versa.

By virtue of the two prebending operations in conjunction with the clamping of the workpiece, both surfaces of the workpiece to be cut are for example fixed between the workpiece holder and the contact surface of the second cutting means in such a way that the workpiece is substantially prevented from being drawn out of the not-for-cutting region of the contact surface of the second cutting means, resulting in the quality of the cut edges being further increased.

In a further embodiment of the method according to the invention, the first and/or the second prebend are/is elastic. That is to say that, in the stressed region, the workpiece is not substantially stressed beyond its elastically deformable range. As a result of the elastic prebending, the cut workpiece springs back into its initial shape after the cutting operation. Consequently, the bending and cutting operation has no influence on the shape of the workpiece. In addition, the second prebend, which is oriented virtually symmetrically to the cutting location, can give rise to substantially identical transverse forces which, on account of their opposite directions, can cancel each other out at least as far as possible. As a result, the loading on the cutting means can be further reduced.

According to a preferred embodiment of the method according to the invention, an open cut is produced by the cutting operation by means of the cutting means. Open cuts are characterized within the scope of the invention as those cuts which do not have a closed cut line in the relevant cut region. A typical cutting process for producing open cut lines is shearing, wherein the open cut can be executed for example as a substantially rectilinear cut line. In the case of a closed cut, two cuts are executed simultaneously, that is to say that necessarily the opposite sides of the workpiece are also concomitantly cut, for example during punching. In this case, the workpiece clamping is not one-sided but two-sided. If the prebending angles at the opposite sides then remain in the stated high region, this would necessarily lead to inadmissibly increased overall stresses in the workpiece and to premature failure, since, besides the bending stresses, additional tensile stresses also appear between the two opposite cut regions. The stated effects are unavoidable. It is therefore particularly advantageous to reduce the at least second prebending angles of the mutually opposite cutting locations, for example by at least one third.

According to a further embodiment of the method according to the invention, the method is a one-stage method. A one-stage implementation of the method according to the invention allows a reduction in the necessary processing steps of the workpiece and thus advantageously affords a cost saving.

The above-specified object is additionally achieved according to a second teaching by a device for cutting which is particularly designed to preferably carry out the above-described method. This occurs in that the contact surface of the second cutting means rises starting from a substantially planar level, forms a convex region and falls again toward the second cutting edge of the second cutting means. The thus produced advantages and embodiments result from the statements pertaining to the aforementioned method according to the invention.

The region of the contact surface toward the cutting edge of the second cutting means is preferably spaced apart from the highest point of the convex region on which the workpiece rests. In conjunction with the stated lowering (falling region), the level of the cutting edge is situated lower such that neither the cutting edge of the first cutting means nor the cutting edge of the second cutting means is in contact with the workpiece during the execution of the second prebending.

As already stated for the method according to the invention, such a device can be used to produce a high-quality cut with, as required, a high fraction and simultaneously reduce the wear of the cutting means.

According to a preferred embodiment of the cutting device according to the invention, the cutting angle of the cutting edge of the first cutting means is formed as an obtuse angle, which means that the adjoining contact surface is situated obliquely with respect to the general workpiece position. In particular, the surface which adjoins the cutting edge of the first cutting means and impinges the workpiece during prebending/cutting (contact surface) is of oblique design, with it not being necessary for the entire surface to have such a shape. However, it is advantageously intended to ensure that the first cutting means is applied initially by a part remote from the cutting edge to the workpiece before the first cutting edge in order to provide said workpiece in particular with the second prebend. There thus occurs earlier cracking initiation in the cut region than in the conventional designs from the prior art and thus the reduction in the compressive stresses on the cutting edge.

The obtuse cutting angle and the leading (of the contact surface) with respect to the cutting edge are preferably chosen such that the tensile stress in the workpiece to be separated on the cut contour has precisely not yet reached the material-typical tensile strength when the cutting edge of the first cutting means impinges the workpiece in order to cut the workpiece. Thus, the bevel has, with respect to the planar workpiece position, for example an angle of 8°, or in other words the obtuse angle of the cutting edge of the first cutting means is for example 98°.

According to a further embodiment of the cutting device according to the invention, the first cutting edge and/or the second cutting edge have/has an obtuse angle, wherein, in the case of the open cut, the angle of the first cutting edge preferably corresponds to that of the second cutting edge. The cutting edge angles accordingly have values above 90°, in particular between 95° and 110°, which prolongs the life of the cutting edges.

According to a further embodiment of the cutting device according to the invention, the first cutting edge and/or the second cutting edge have/has an obtuse angle, wherein, in the case of the closed cut, the angle of the first cutting edge is preferably less than the angle of the second cutting edge.

According to a further embodiment of the cutting device according to the invention, the first and/or the second cutting edge are/is rounded, wherein the first and/or the second cutting edge have/has in particular a defined rounding (radius of the cutting edge), preferably being rounded in the range between 0.01 and 1 mm. With particular preference, the cutting edges are differently rounded, with further preference the first cutting edge being rounded less than the second cutting edge, with preferably the first cutting edge having a rounding of 0.05 mm and the second cutting edge having a rounding of 0.1 mm. Such an embodiment of the cutting device according to the invention ensures an increase in the contact zone between the cutting edge and workpiece and thus an optimized distribution of the force with the effect on the local stresses as the tip penetrates into the workpiece surface. This reduces the surface pressure on the tool and thus reduces the stresses. This makes it possible to achieve a further improvement in the cut quality and a further reduction in the wear of the cutting means. Longer service lives are achieved as a result.

According to a further preferred embodiment of the cutting device according to the invention, a gap is provided between the tool holder and the first cutting means, wherein the gap is preferably chosen to be of a such size that the tool holder is situated behind the highest point of the convex region of the contact surface. This embodiment ensures that, particularly during the first prebending of the workpiece, the nonclamped region can lift to a greater or lesser extent upward from the contact surface of the second cutting means.

It is preferable in addition for the tool holder to be designed to be complementary and/or offset in relation to the shape of the contact surface of the second cutting means, preferably by the workpiece thickness. The workpiece holder preferably has the shape of the contact surface of the second cutting means as a convex offset in relation to the contact surface. The convex curvature of the workpiece holder is here preferably open to the front in the direction of the cutting location. This configuration, in conjunction with the in particular lower-lying second cutting edge, ensures that the workpiece has no contact with the second cutting edge of the second cutting means until the desired prebending has been achieved.

The device according to the invention can preferably be integrated into deep-drawing and trimming operations of a press or be implemented singularly in guillotine shears. Thus, the device according to the invention can advantageously be used integrated in guillotine shears or in a cutting tool.

By way of the preceding and following description of method steps according to preferred embodiments of the method, it is also the intention for corresponding means for carrying out the method steps by way of preferred embodiments of the device to be disclosed. Likewise, by way of the disclosure of means for carrying out a method step, it is the intention for the corresponding method step to be disclosed.

Figure 2:
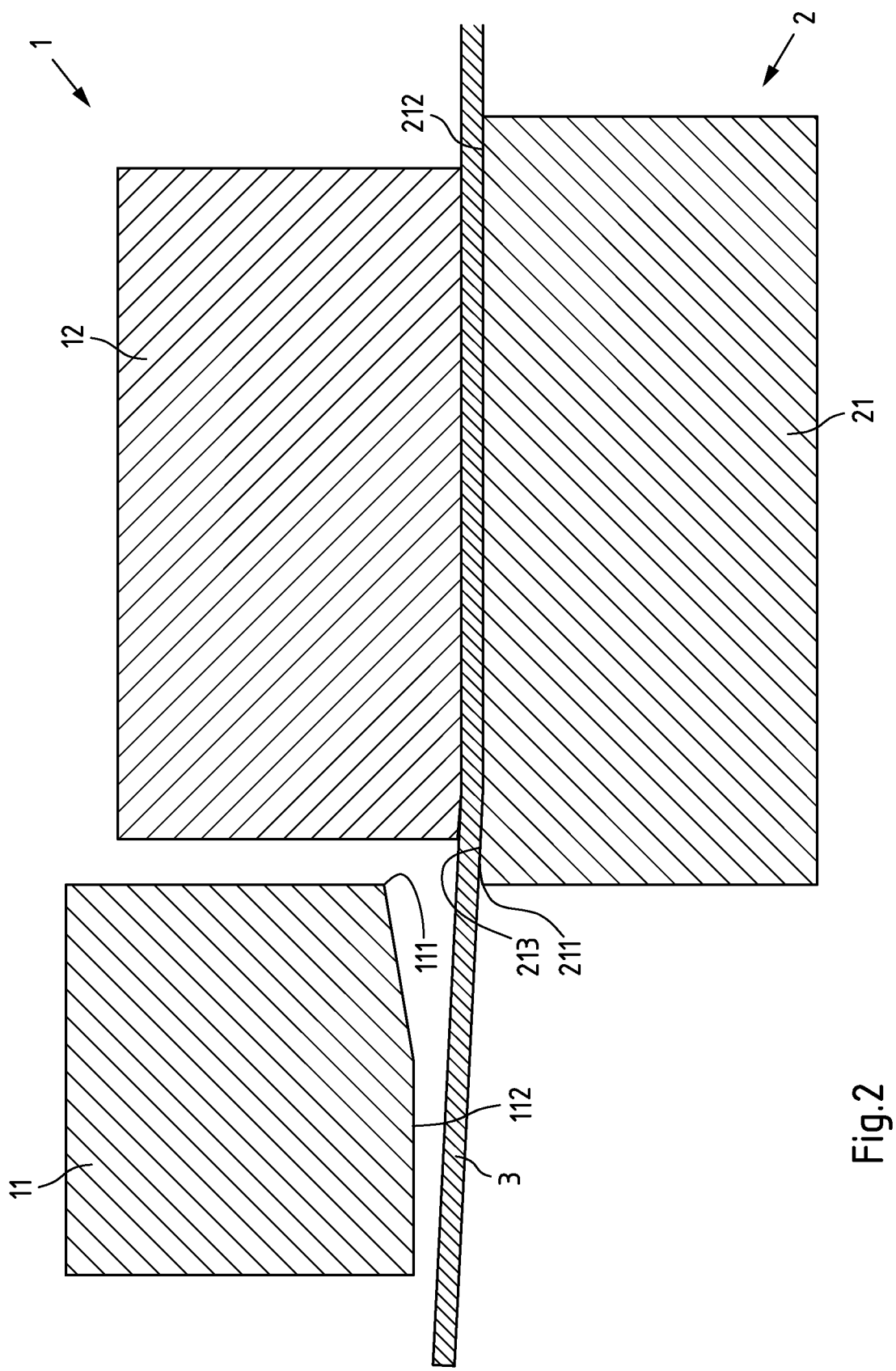
Figure 3:
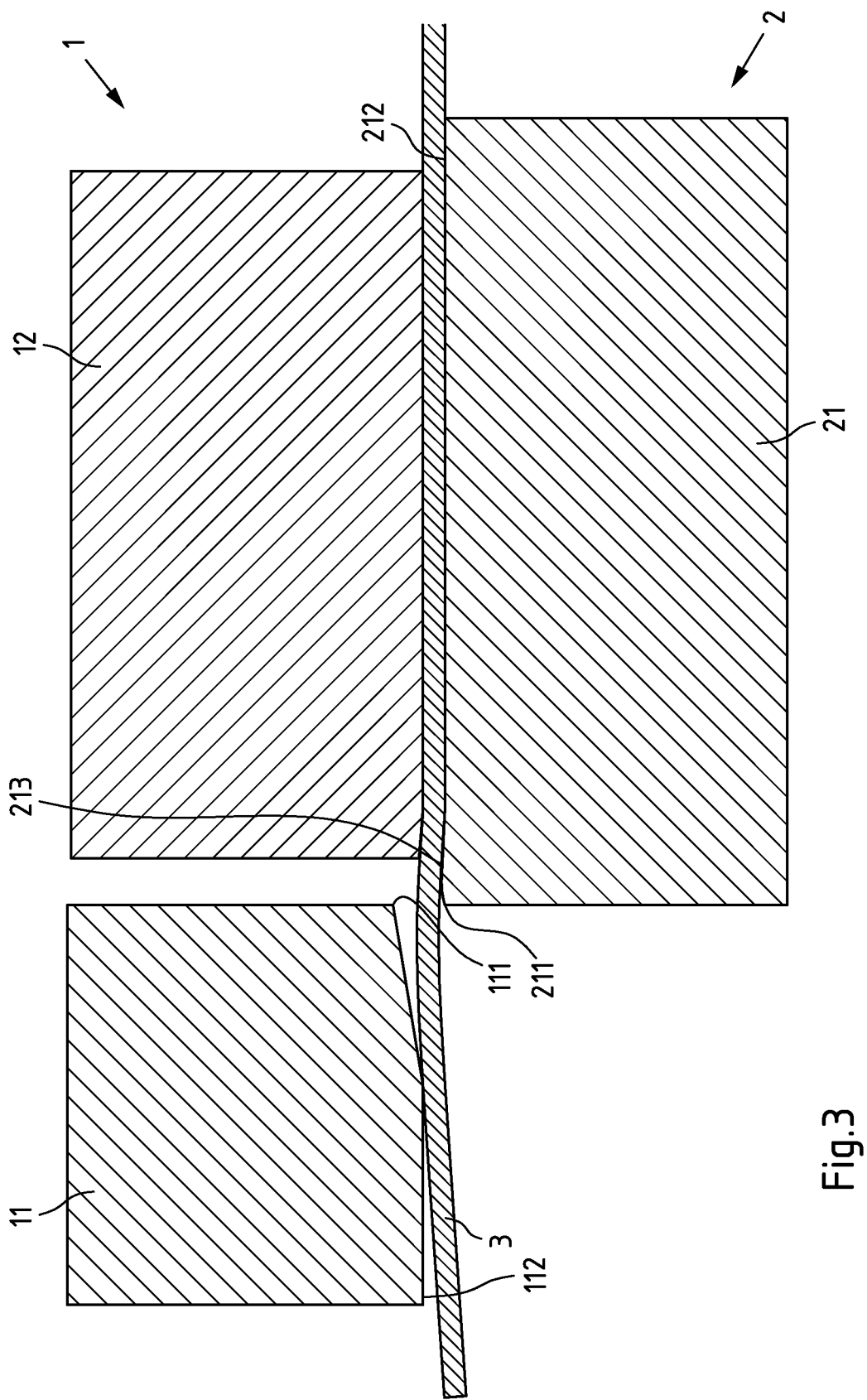
Figure 4:
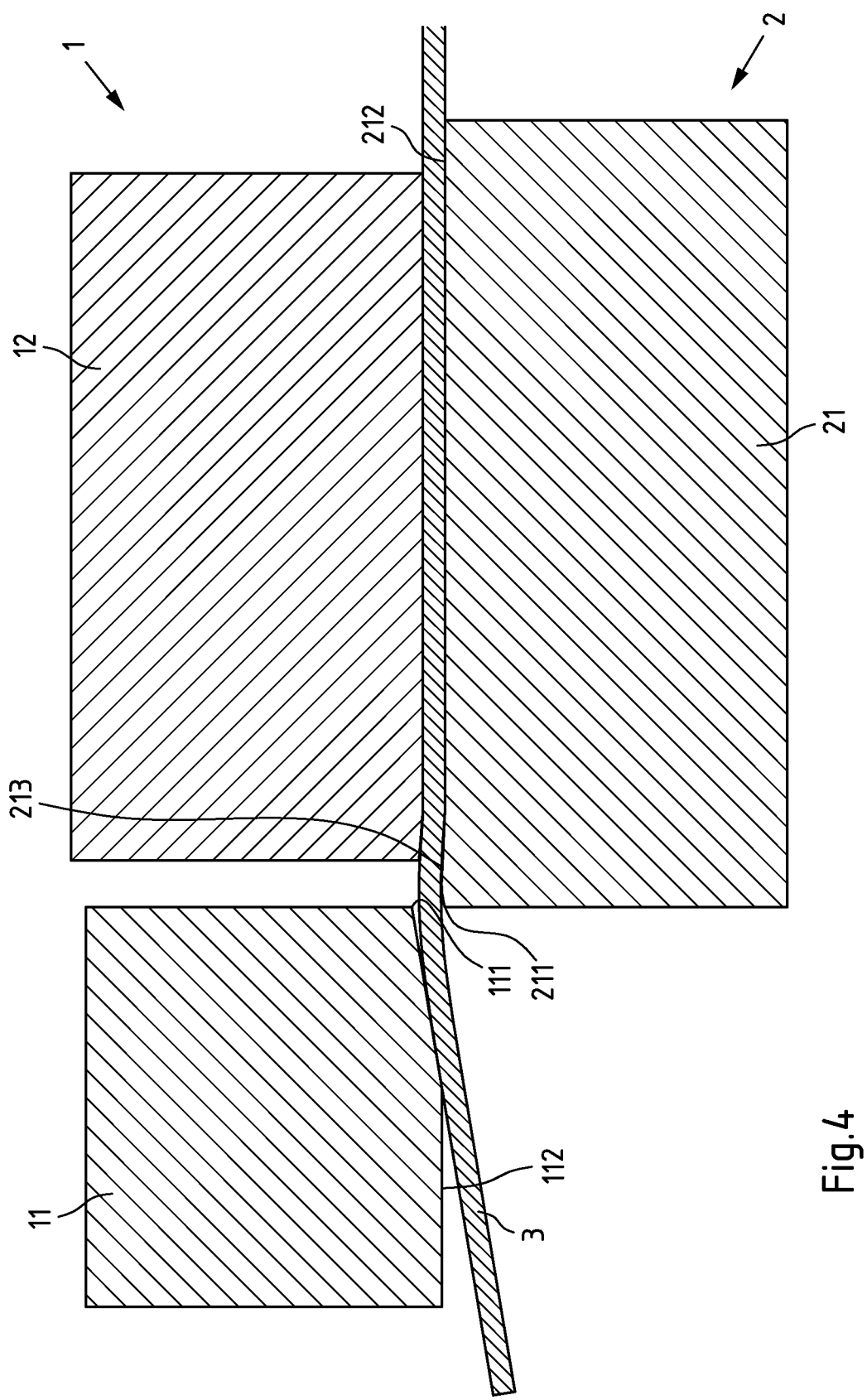
Figure 5:
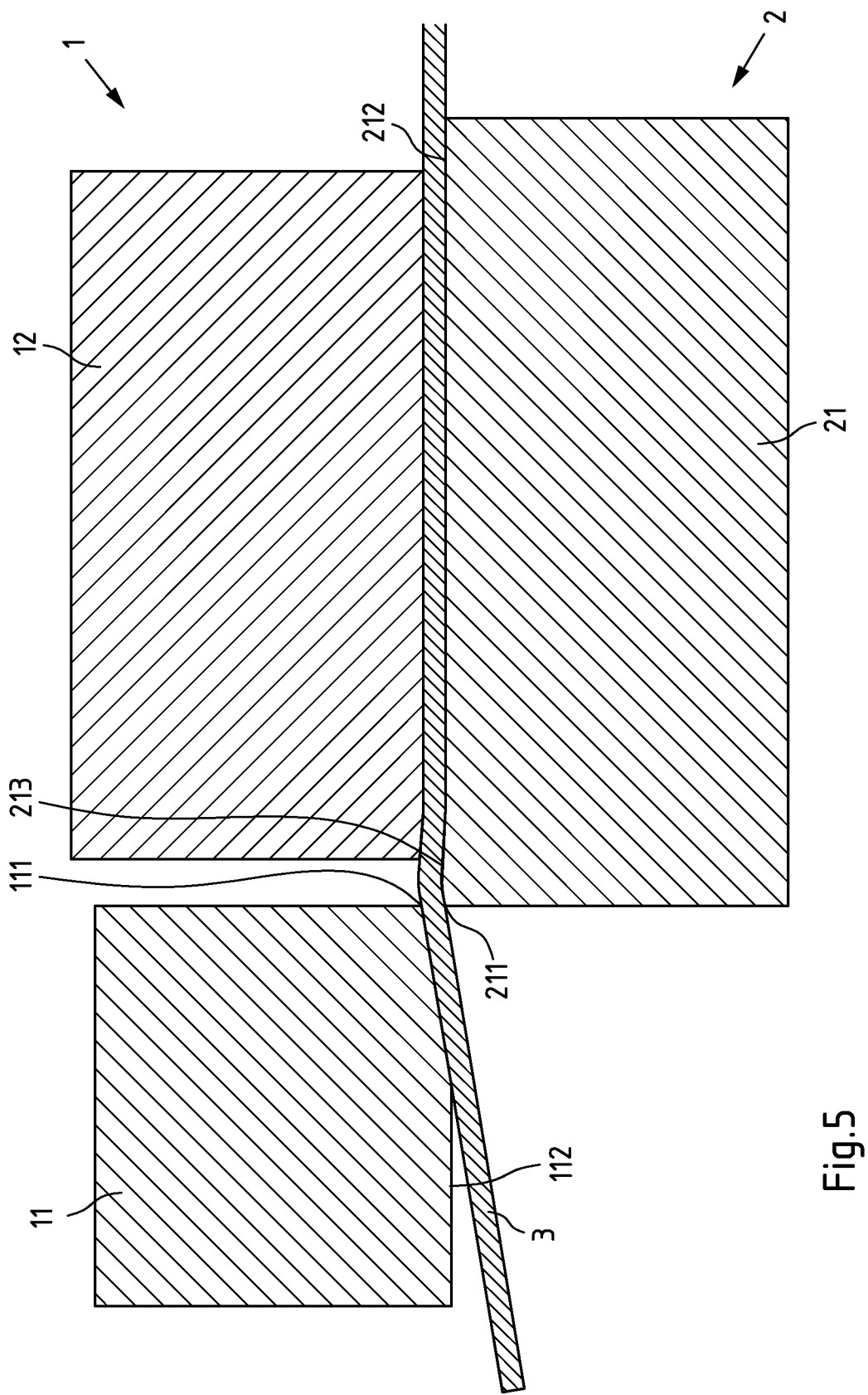
Figure 6:
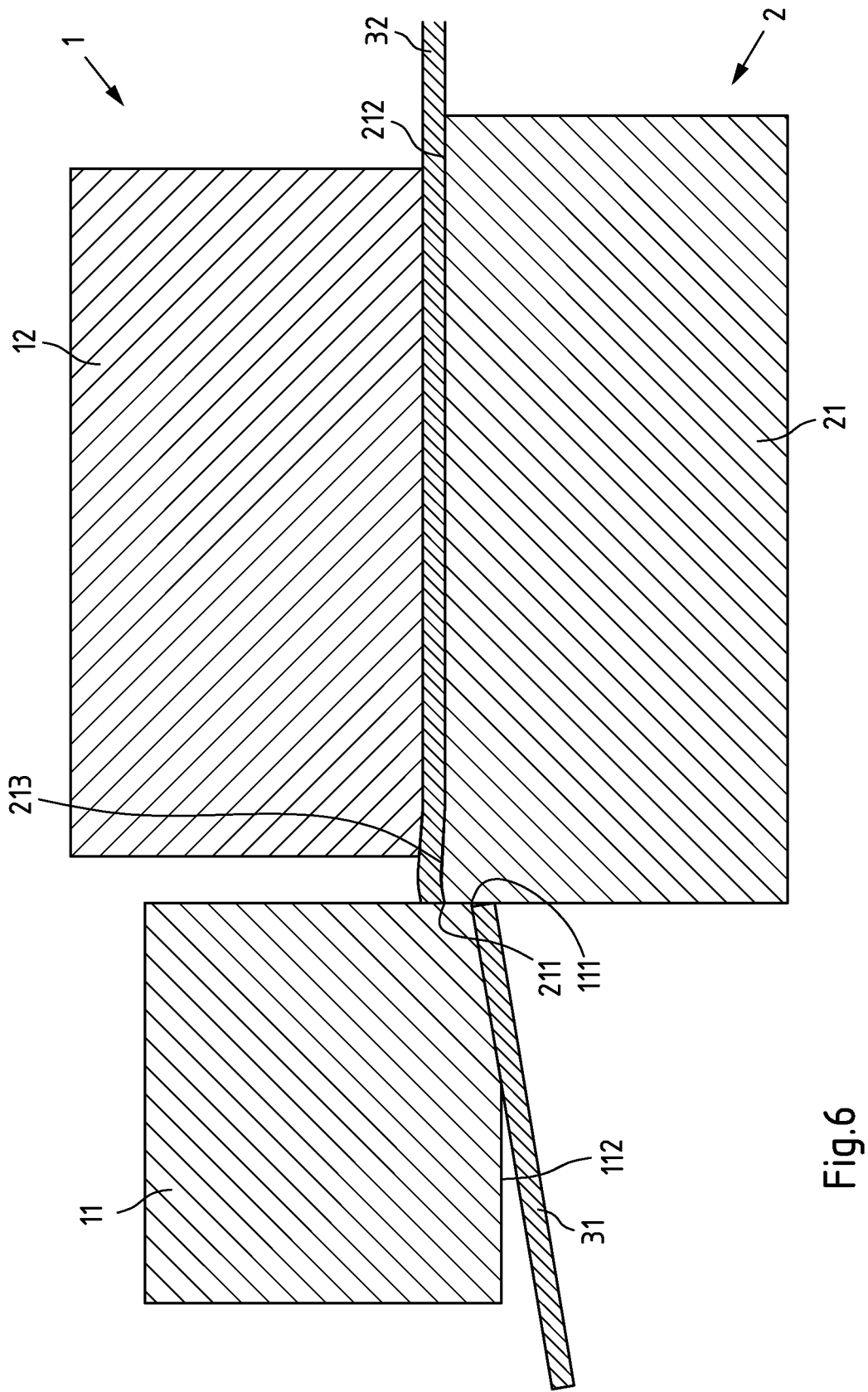
Figure 7:
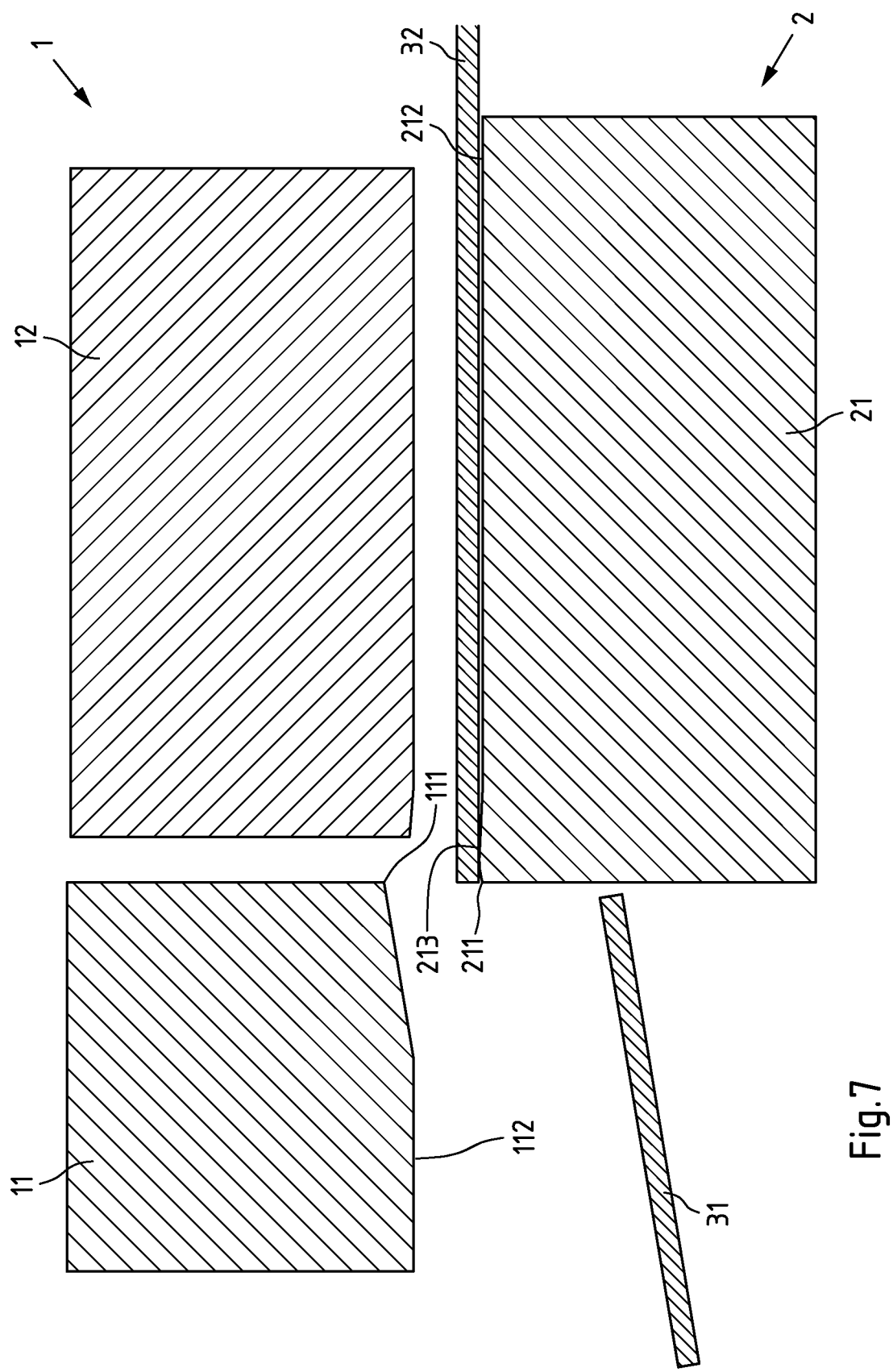

The invention will be further explained below on the basis of an exemplary embodiment with reference to the drawing, in which FIG. 1 shows a full section of an exemplary embodiment of a device according to the invention in a schematic illustration during the method step of insertion, FIG. 2 shows a full section of the device in a schematic illustration during the method step of clamping and of introducing a first prebend in the workpiece to be cut, FIG. 3 shows a full section of the device in a schematic illustration during the application of the first cutting means to a workpiece to be cut, FIG. 4 shows a full section of the device in a schematic illustration during the further lowering of the first cutting means and the introduction of a second prebend into the workpiece to be cut, FIG. 5 shows a full section of the device in a schematic illustration during the common impingement of the first and second cutting edge on the workpiece, FIG. 6 shows a full section of the device in a schematic illustration directly after the method step of cutting, and FIG. 7 shows a full section of the device in a schematic illustration during the method step of removal.

FIG. 1 shows a full section of an exemplary embodiment of a device according to the invention in a schematic illustration during the method step of insertion. The device carries out an exemplary embodiment of a method according to the invention. The device has a first upper tool half 1 having a first cutting means 11 in the form of an upper blade, which comprises a first cutting edge 111 and a contact surface 112, and a workpiece holder 12 in the form of a holding-down means. In addition, the device has a second tool half 2 having a second cutting means 21 in the form of a lower blade, which comprises a second cutting edge 211 and a contact surface 212. The first tool half 1 preferably consists of a lowerable composite part which is as solid as possible and which can be lowered in a substantially vertical movement. Here, the workpiece holder 12 and the first cutting means 11, wherein the first cutting edge 111 adjoins the contact surface 112, can be lowered vertically separately from one another. The second tool half 2 is substantially in one piece, wherein the second cutting edge 211 adjoins the contact surface 212, which has a convex region 213.

Furthermore, the first tool half 1 preferably has guide elements (not shown) which allow an exact relative movement and cutting gap setting between the two tool halves 1 and 2. A workpiece 3 in the form of a sheet metal blank is inserted into the device. The contact surface 212 of the second cutting means 21 rises starting from a substantially planar level, in particular the region directed away from the cutting edge 211 (right part of the second cutting means 21), forms, in particular close to or in the region directed toward the cutting edge 211 (left part of the second cutting means 21), a convex region, and falls again toward the second cutting edge 211 of the second cutting means 21. The contact surface 112 of the first cutting means 11 starts substantially from a planar level, in particular the region directed away from the cutting edge 111 (left part of the first cutting means 11), and transitions into an inclined region in particular close to or directed toward the cutting edge 111 (left part of the first cutting means 11).

When carrying out the cutting operation, as illustrated in FIG. 2 and following figures, at first the tool holder 12 is applied to the workpiece 3 and presses it with sufficiently large pressing force against the contact surface 212 such that the workpiece 3 to be cut is fixed in such a way that slipping or cold flow is substantially prevented. With the lowering of the workpiece holder 12, the workpiece 3 simultaneously undergoes a first, preferably elastic upward prebending.

Then, as illustrated in FIG. 3, the first cutting means 11 moves further downward while the workpiece holder 12 remains applied to the workpiece 3. By virtue of the oblique shape of the first cutting means 11, the latter initially impinges the workpiece 3 by way of a contact surface 112 which leads in relation to the first cutting edge 111 and bends the workpiece 3 downward in its further downward movement (second prebending).

FIG. 4 shows the intermediate state during lowering of the cutting means 11. It is evident that even at this time there is still no contact between the two cutting edges 111, 211 and the workpiece 3 although the workpiece 3 is already in a relatively intensely prebent state.

The described bending stresses produce an increasing, particularly high bending stress in the region of the cut contour to be produced, both in the effective region of the first and of the second cutting means 11, 21. With further downward movement. The tensile stress increases, with the tensile stress produced preferably being less than the tensile strength of the workpiece or being able to be preferably close thereto.

As illustrated in FIG. 5, the first and the second cutting edge 111, 211 then impinge the workpiece 3 and begin to apply a shear stress thereto. The shear stress, together with the introduced tensile stress, produces an equivalent stress which leads to material separation. This is illustrated in FIG. 6. Upon conclusion of the separating operation, the previously bent workpiece portions 31, 32 relax again until, ideally, they finally completely spring back again into their initial shape, as shown in the removal position in FIG. 7.

The cutting operation described in this respect is accompanied by low forces on the cutting edges and by little tool wear. High separating surface or cut face qualities are achieved. The illustrated cutting device is preferably integrated into the deep-drawing and trimming operations of a press that are necessary in any case.

The invention claimed is:

1. A method for cutting a workpiece comprising one of a blank and a component, the method comprising the following steps:
    inserting the workpiece into a cutting device, the cutting device comprising (i) a first tool half having a workpiece holder and at least one first cutting means, which comprises a first cutting edge and a first cutting means contact surface, and (ii) a second tool half having at least one second cutting means having a second cutting edge and a second cutting means contact surface, the second cutting means contact surface having a planar region that transitions to an inclined region near the second cutting edge,
    clamping the workpiece with the workpiece holder wherein a pressing force between the workpiece holder and the second cutting means causes the workpiece to undergo a first upward prebending at the inclined region;
    advancing the first cutting means downward while the workpiece holder remains applied to the workpiece wherein the first cutting means initially impinges the workpiece with the first cutting means contact surface which leads in relation to the first cutting edge and bends the workpiece downward through further downward movement of the first cutting means causing the workpiece to have a second downward prebending, wherein the first and second prebending of the workpiece occur prior to contact of the first and second cutting edges with the workpiece; and
    further advancing the first cutting means downward wherein the first and second cutting edges impinge the workpiece and apply a shear stress thereto producing material separation of the workpiece.

2. The method of claim 1 wherein the first prebending is in a direction counter to the advancing of the first cutting means downward.

3. The method of claim 2 wherein the first prebending is in a direction opposite the second prebending.

4. The method of claim 1 wherein the first prebending causes a tensile stress in the workpiece, the tensile stress being less than a yield point of the workpiece.

5. The method of claim 1 wherein at least one of the first and the second prebending are elastic.

6. The method of claim 1 wherein the material separation comprises an open cut.

7. The method of claim 1 wherein the material separation comprises a closed cut.

* * * * *